United States Patent
Zhang et al.

(10) Patent No.: US 10,366,275 B2
(45) Date of Patent: Jul. 30, 2019

(54) METHOD AND DEVICE FOR IMPROVING FINGERPRINT TEMPLATE, AND TERMINAL DEVICE

(71) Applicant: Guangdong Oppo Mobile Telecommunications Corp., Ltd., Dongguan, Guangdong (CN)

(72) Inventors: Haiping Zhang, Guangdong (CN); Yibao Zhou, Guangdong (CN)

(73) Assignee: Guangdong Oppo Mobile Telecommunications Corp., Ltd., Dongguan (CN)

(*) Notice: Subject to any disclaimer, the term of this patent is extended or adjusted under 35 U.S.C. 154(b) by 0 days.

(21) Appl. No.: 16/196,200

(22) Filed: Nov. 20, 2018

(65) Prior Publication Data
US 2019/0130160 A1 May 2, 2019

Related U.S. Application Data

(63) Continuation of application No. 15/547,726, filed as application No. PCT/CN2016/099362 on Sep. 19, 2016.

(30) Foreign Application Priority Data

Nov. 13, 2015 (CN) .......................... 2015 1 0784165

(51) Int. Cl.
*G06K 9/00* (2006.01)
*G06K 9/62* (2006.01)

(52) U.S. Cl.
CPC .......... *G06K 9/00087* (2013.01); *G06K 9/00* (2013.01); *G06K 9/00013* (2013.01);
(Continued)

(58) Field of Classification Search
CPC ............. G06K 9/00087; G06K 9/6202; G06K 9/00926; G06K 9/00093; G06K 9/00073;
(Continued)

(56) References Cited

U.S. PATENT DOCUMENTS

2003/0039382 A1* 2/2003 Yau .................... G06K 9/00067
382/125
2005/0134427 A1* 6/2005 Hekimian ............... G06F 21/32
340/5.53
(Continued)

FOREIGN PATENT DOCUMENTS

| CN | 101231691 A | 7/2008 |
| CN | 101231692 A | 7/2008 |

(Continued)

OTHER PUBLICATIONS

Roli Bansal et al: "Minutiae Extraction from Fingerprint Images—a Review", vol. 8, No. 3, Sep. 1, 2011.
(Continued)

*Primary Examiner* — Ming Y Hon
(74) *Attorney, Agent, or Firm* — Young Basile Hanlon & MacFarlane, P.C.

(57) ABSTRACT

A method and a device for improving a fingerprint template, and a terminal device are proposed. The method includes: extracting first feature information of a recorded fingerprint image based on preset fingerprint feature types; determining a degree of matching between the first feature information and second feature information based on the second feature information corresponding to the fingerprint feature types in a registered fingerprint template; determining whether the degree of matching is higher than or equal to a preset compensation threshold value; and acquiring a compensation image having no intersection with the fingerprint template from the fingerprint image if the degree of matching is higher than or equal to the compensation threshold value, (Continued)

and adding the compensation image to the fingerprint template.

15 Claims, 5 Drawing Sheets

(52) U.S. Cl.
CPC ..... G06K 9/00026 (2013.01); G06K 9/00073 (2013.01); G06K 9/00093 (2013.01); G06K 9/00926 (2013.01); G06K 9/6202 (2013.01); G06K 9/6215 (2013.01)

(58) Field of Classification Search
CPC ............. G06K 9/6215; G06K 9/00013; G06K 9/00026; G06K 9/00
See application file for complete search history.

(56) References Cited

U.S. PATENT DOCUMENTS

| | | | | |
|---|---|---|---|---|
| 2005/0238212 A1* | 10/2005 | Du | ............... | G06K 9/00026 382/124 |
| 2009/0052752 A1* | 2/2009 | Monden | ............. | G06K 9/00093 382/124 |
| 2009/0232368 A1* | 9/2009 | Niinuma | ............ | G06K 9/00107 382/124 |
| 2010/0232659 A1* | 9/2010 | Rahmes | ............. | G06K 9/00087 382/125 |
| 2013/0051607 A1* | 2/2013 | Highley | ............. | G06K 9/00449 382/100 |
| 2013/0329967 A1* | 12/2013 | Abiko | ................ | G06K 9/00026 382/115 |
| 2015/0235055 A1* | 8/2015 | An | ........................ | G06F 21/74 713/186 |
| 2016/0063294 A1* | 3/2016 | Du | ....................... | G06K 9/0002 382/124 |
| 2016/0328596 A1* | 11/2016 | Midgren | ................. | G06F 21/32 |
| 2017/0127283 A1* | 5/2017 | Tanabe | ................... | G06F 21/36 |

FOREIGN PATENT DOCUMENTS

| | | |
|---|---|---|
| CN | 101499130 A | 8/2009 |
| CN | 101604384 A | 12/2009 |
| CN | 101918981 A | 12/2010 |
| CN | 105303176 A | 2/2016 |
| WO | 2015104115 A1 | 7/2015 |

OTHER PUBLICATIONS

Extended European search report issued in corresponding European application No. 16863488.9 dated Apr. 20, 2018.

International search report issued in corresponding international application No. PCT/CN2016/099362 dated Dec. 12, 2016.

Xudong Jiang et al: "Online Fingerprint Template Improvement", Aug. 2, 2002 (Aug. 2, 2002).

Umut Uludag et al: "Biometric template selection and update: a case study in fingerprints", Nov. 13, 2003.

Office Action issued in corresponding European application No. 16863488.9 dated Apr. 2, 2019.

* cited by examiner

METHOD AND DEVICE FOR IMPROVING FINGERPRINT TEMPLATE, AND TERMINAL DEVICE

CROSS-REFERENCE TO RELATED APPLICATION(S)

This application is a continuation of U.S. application Ser. No. 15/547,726, filed on Jul. 31, 2017, which is a 371 of PCT/CN2016/099362, filed on Sep. 19, 2016, which claims priority to Chinese Application No. 201510784165.7, filed on Nov. 13, 2015. The entire disclosures of the above applications are incorporated herein by reference in their entireties.

TECHNICAL FIELD

The present disclosure relates to a fingerprint recognition technology, more particularly, to a method and a device for improving a fingerprint template, and a terminal device.

BACKGROUND

With the development of finger recognition technology, an increasing number of terminals are integrated with the finger recognition function. The processing efficiency and security of corresponding operations are increased through the finger recognition technology, for example, an unlock operation of a mobile terminal, a payment operation of a mobile paying device, a control operation of an access control system and a clock in/out operation of an attendance device, etc.

During the fingerprint recognition process, the quality of a registered fingerprint template determines the recognition performance during the use process by a user. However, in order to satisfy the appearance requirement of the terminal equipment having the finger recognition function, the size of finger modules becomes increasingly smaller, which in turn causes the area of a fingerprint image in the registered fingerprint template to be overly small. Thus, the recognition rate is very low in the use phase, that is, the non-match rate is very high.

Currently, the user is required to input his fingerprint multiple times to increase the area of the fingerprint image in the fingerprint template when registering. However, for an inexperienced user, the quality of recorded fingerprint template is still not high even though the number of recording is sufficient.

SUMMARY

The present application is intended to resolve one of the technical problems in the related art to at least a certain extent.

A first objective of the present application is to provide a method for improving a fingerprint template. The method continuously improves an initially registered fingerprint template during the fingerprint recognition process. The match rate of fingerprint recognition is improved and the inflexibility and limitations of the fingerprint template are overcome, which improves the overall performance of the fingerprint recognition system in the registration phase and the recognition phase.

A second objective of the present application is to provide a device for improving a fingerprint template.

A third objective of the present application is to provide a terminal device.

A fourth objective of the present application is to provide a non-transitory computer-readable storage medium.

In an implementation of a first aspect, the present application provides a method for improving a fingerprint template to achieve the objectives. The method for improving the fingerprint template includes: First feature information of a recorded fingerprint image is extracted based on preset fingerprint feature types, wherein different fingerprint feature types are preset based on different recognition accuracy for the fingerprint image; a degree of matching between the first feature information and second feature information is determined based on the second feature information corresponding to the fingerprint feature types in a registered fingerprint template; whether the degree of matching is higher than or equal to a preset compensation threshold value is determined; a compensation image outside an intersection of the fingerprint image and the fingerprint template is acquired from the fingerprint image if the degree of matching is higher than or equal to the compensation threshold value, and the compensation image is added to the fingerprint template; whether the degree of matching is higher than or equal to a preset recognition threshold value is determined, wherein the recognition threshold value is less than the compensation threshold value; a corresponding event is responded based on a preset instruction if the degree of matching is higher than or equal to the recognition threshold value.

In an implementation of a second aspect, a device for improving a fingerprint template is provided. The device for improving a fingerprint template includes an extracting module, a matching module, a first judging module, a first processing module, a second judging module and a second processing module. The extracting module is configured to extract first feature information of a recorded fingerprint image based on preset fingerprint feature types, wherein different fingerprint feature types are preset based on different recognition accuracy for the fingerprint image. The matching module is configured to determine a degree of matching between the first feature information and second feature information based on the second feature information corresponding to the fingerprint feature types in a registered fingerprint template. The first judging module is configured to determine whether the degree of matching is higher than or equal to a compensation threshold value that is preset. The first processing module is configured to acquire a compensation image having no intersection with the fingerprint template from the fingerprint image if the degree of matching is higher than or equal to the compensation threshold value, and add the compensation image to the fingerprint template. The second judging module is configured to determine whether the degree of matching is higher than or equal to a preset recognition threshold value, wherein the recognition threshold value is less than the compensation threshold value. The second processing module, configured to respond a corresponding event based on a preset instruction if the degree of matching is higher than or equal to the recognition threshold value.

In an implementation of a third aspect, a terminal device is provided. The terminal includes a casing, a processor, a memory, a circuit board, and a power circuit. The circuit board is disposed in a space surrounded by the casing. The processor and the memory are disposed on the circuit board. The power circuit is configured to supply power to various circuits or components of the terminal. The memory is configured to store executable program instructions. The processor runs a program corresponding to the executable program instructions through reading the executable program instructions stored in the memory so as to execute the following blocks:

First feature information of a recorded fingerprint image is extracted based on preset fingerprint feature types, wherein different fingerprint feature types are preset based on different recognition accuracy for the fingerprint image.

A degree of matching between the first feature information and second feature information is determined based on the second feature information corresponding to the fingerprint feature types in a registered fingerprint template.

Whether the degree of matching is higher than or equal to a preset compensation threshold value is determined. A compensation image having no intersection with the fingerprint template is acquired from the fingerprint image if the degree of matching is higher than or equal to the compensation threshold value, and the compensation image is added to the fingerprint template.

Whether the degree of matching is higher than or equal to a preset recognition threshold value is determined, wherein the recognition threshold value is less than the compensation threshold value. A corresponding event is responded based on a preset instruction if the degree of matching is higher than or equal to the recognition threshold value.

In an implementation of a fourth aspect, a non-transitory computer-readable storage medium is provided. The non-transitory computer-readable storage medium stores one or more program instructions executable by a processor. The processor executes the one or more program instructions to perform the method for improving a fingerprint template as provided above.

The present application continuously improves an initially registered fingerprint template during the fingerprint recognition process. The match rate of fingerprint recognition is improved and the inflexibility and limitations of the fingerprint template are overcome, which improve the overall performance of the fingerprint recognition system in the registration phase and the recognition phase.

BRIEF DESCRIPTION OF THE DRAWINGS

The accompanying drawings are included to provide a further understanding of the disclosure, and are incorporated in and constitute a part of this specification. The drawings illustrate implementations of the disclosure and, together with the description, serve to explain the principles of the disclosure.

DETAILED DESCRIPTION

Figure 1:
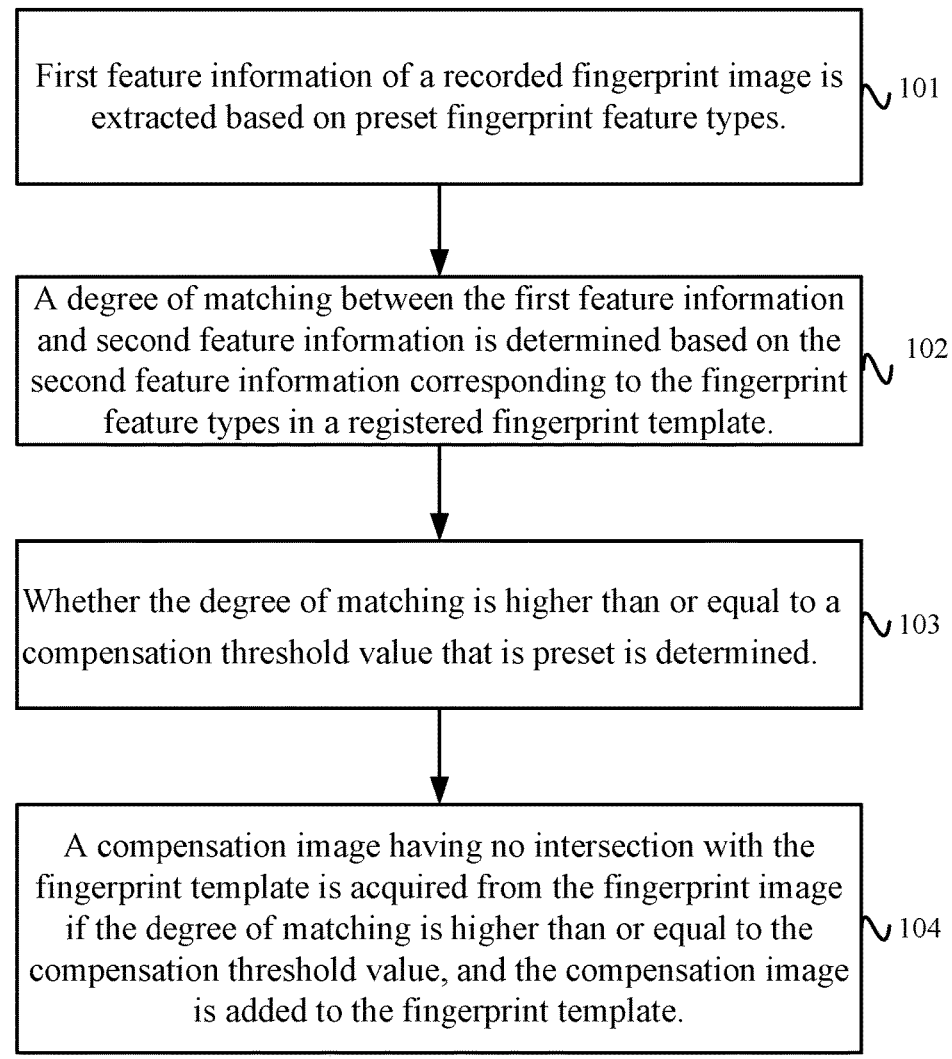
FIG. 1 illustrates a flowchart of a method for improving a fingerprint template according to one implementation of the present disclosure.

Implementations of the present application are illustrated in detail in the accompanying drawings, in which like or similar reference numerals refer to like or similar elements or elements having the same or similar functions throughout the specification. The implementations described below with reference to the accompanying drawings are exemplary and are intended to be illustrative of the present application, and are not to be construed as limiting the scope of the present application.

A description of a method for improving a fingerprint template and a device and a terminal thereof according to implementations of the present disclosure is provided as follows with reference to accompanying drawings.

FIG. 1 illustrates a flowchart of a method for improving a fingerprint template according to one implementation of the present disclosure.

The method for improving the fingerprint template can begin at block 101.

At block 101, first feature information of a recorded fingerprint image is extracted based on preset fingerprint feature types.

In greater detail, the method for improving the fingerprint template according to the present implementation disposed in a terminal having a fingerprint recognition function is taken as an example for illustration. It is noted that the types of terminals are many and the terminal may be selected depending on an application, for example, a cell phone, an attendance device, a paying device, or an access control device, etc.

First, when a user records a fingerprint, the first feature information of the recorded fingerprint image is extracted based on the preset fingerprint feature types after acquiring a fingerprint image recorded every time. The fingerprint feature types are indices configured to compare a similarity between the recorded fingerprint image and a registered fingerprint so as to recognize the recorded fingerprint image based on a comparison result.

The more preset fingerprint feature types there are, the higher the recognition accuracy for the fingerprint image is. Since the accuracy requirement for fingerprint image recognition in different application scenarios varies, the fingerprint feature types may be disposed depending on practical needs. In an implementation, different fingerprint feature types can be preset based on different recognition accuracy for the fingerprint image. An example is provided as follows.

The fingerprint feature types may be fingerprint feature points. The fingerprint feature points include one of a bifurcation point, an end point, a core point, and a delta point, or combinations thereof. A type of the fingerprint feature point may be selected depending on requirements of the application scenario. Or, the fingerprint feature types may be the fingerprint feature points, and combinations of direction information indicating relationships between the fingerprint feature points.

At block 102, a degree of matching between the first feature information and second feature information is determined based on the second feature information corresponding to the fingerprint feature types in a registered fingerprint template.

In greater detail, a fingerprint template is pre-registered before the user records the fingerprint. The fingerprint template stores the second feature information corresponding to the preset fingerprint feature types. Since extracted fingerprint feature information are different after different fingerprint images are processed based on the preset fingerprint feature types, whether or not the recorded fingerprint image is the registered fingerprint template can be identified through the fingerprint feature information.

First, the second feature information of the registered fingerprint template is compared with the first feature information to determine the degree of matching between the first feature information and the second feature information. The more same feature information between the first feature information and the second feature information there is, the higher the degree of matching between the first feature information and the second feature information is. As a result, the recorded fingerprint image is recognized as the registered fingerprint template, that is, the higher probability of passing the recognition process. An example is provided as follows.

If the preset fingerprint feature types are the bifurcation point, the end point, the core point and the delta point, and the second feature information is a bifurcation point, an end point, a core point and a delta point in the registered fingerprint template, the first feature information is a bifurcation point, an end point, a core point and a delta point in the recorded fingerprint image. The degree of matching between the first feature information and the second feature information is determined based on a same number of the bifurcation points, a same number of the end points, a same number of the core points and a same number of the delta points in the first feature information and the second feature information.

At block 103, whether the degree of matching is higher than or equal to a compensation threshold value that is preset is determined.

The compensation threshold value for improving information in the fingerprint template is preset based on the accuracy requirement for fingerprint recognition in an application scenario. It is noted that the compensation threshold value is greater than a recognition threshold value. The recognition threshold value is configured to determine whether the degree of matching between the recorded fingerprint image and the registered fingerprint template reaches the recognition threshold value that is preset. If the degree of matching between them is higher than or equal to the preset recognition threshold value, recognition process is passed. If the degree of matching between them is lower than the preset recognition threshold value, recognition process is not passed.

Whether the degree of matching between the first feature information of the recorded fingerprint image and the second feature information of the registered fingerprint template is higher than or equal to the preset compensation threshold value is determined. If it is determined that the degree of matching between them is higher than or equal to the preset compensation threshold value, a quality of a currently recorded fingerprint image is high. Not only can the fingerprint recognition be passed, but the information of the fingerprint template can also be improved based on the currently recorded fingerprint image. If it is determined that the degree of matching between them is lower than the preset compensation threshold value, the quality of the currently recorded fingerprint image does not reach an image quality for improving the fingerprint template. It is only necessary to determine whether the quality of the currently recorded fingerprint image reaches the recognition threshold value so as to determine whether the fingerprint recognition is passed.

At block 104, a compensation image having no intersection with the fingerprint template is acquired from the fingerprint image if the degree of matching is higher than or equal to the compensation threshold value, and the compensation image is added to the fingerprint template.

In greater detail, if it is determined that the degree of matching between the first feature information of the recorded fingerprint image and the second feature information of the registered fingerprint template is higher than or equal to the compensation threshold value, the quality of the currently recorded fingerprint image is high. The information of the fingerprint template can be improved based on the currently recorded fingerprint image.

The fingerprint image and the fingerprint template are compared to acquire the compensation image outside an intersection of the fingerprint image and the fingerprint template from the fingerprint image, and the compensation image is added to the fingerprint template. Image information does not exist when registering is thus added to the fingerprint template. Based on the newly added image information, more feature points or some other feature information can be determined. By utilizing the previously registered feature information and the newly added feature information, subsequently recorded fingerprint images can be more effectively recognized.

It is noted that, according to the present implementation, the compensation image outside the intersection of the fingerprint image and the fingerprint template is added to the fingerprint template so as to determine various required feature information in the fingerprint template based on the compensation image. In order to improve more information, the following actions may be included in another implementation.

In another implementation, in greater detail, the process for improving further includes the following. The first feature information and the second feature information are compared to acquire compensation feature information outside the intersection of the first feature information and the second feature information from the first feature information, and the compensation feature information is added to the fingerprint template. Feature information does not exist when registering is thus added to the fingerprint template. By utilizing the previously registered feature information and the newly added feature information, subsequently recorded fingerprint images can be more effectively recognized.

According to the method for improving the fingerprint template of the present implementation, the first feature information of the recorded fingerprint image is first extracted based on the preset fingerprint feature types. Then, the degree of matching between the first feature information and second feature information is determined based on the second feature information corresponding to the fingerprint feature types in the registered fingerprint template. Whether the degree of matching is higher than or equal to the preset compensation threshold value is determined. If the degree of matching is higher than or equal to the compensation threshold value, the compensation image having no intersection with the fingerprint template is acquired from the fingerprint image, and the compensation image is added to the fingerprint template. Hence, an initially registered fingerprint template is continuously improved during the fingerprint recognition process. The match rate of fingerprint recognition is improved, and the inflexibility and limitations of the fingerprint template are overcome, which improve the overall performance of the fingerprint recognition system in the registration phase and the recognition phase.

In order to more clearly describe the process for recognizing the recorded fingerprint image based on the recognition threshold value, and the process for improving the registered fingerprint template based on the compensation threshold value, a description is provided with reference to subsequent implementations as follows.

Figure 2:
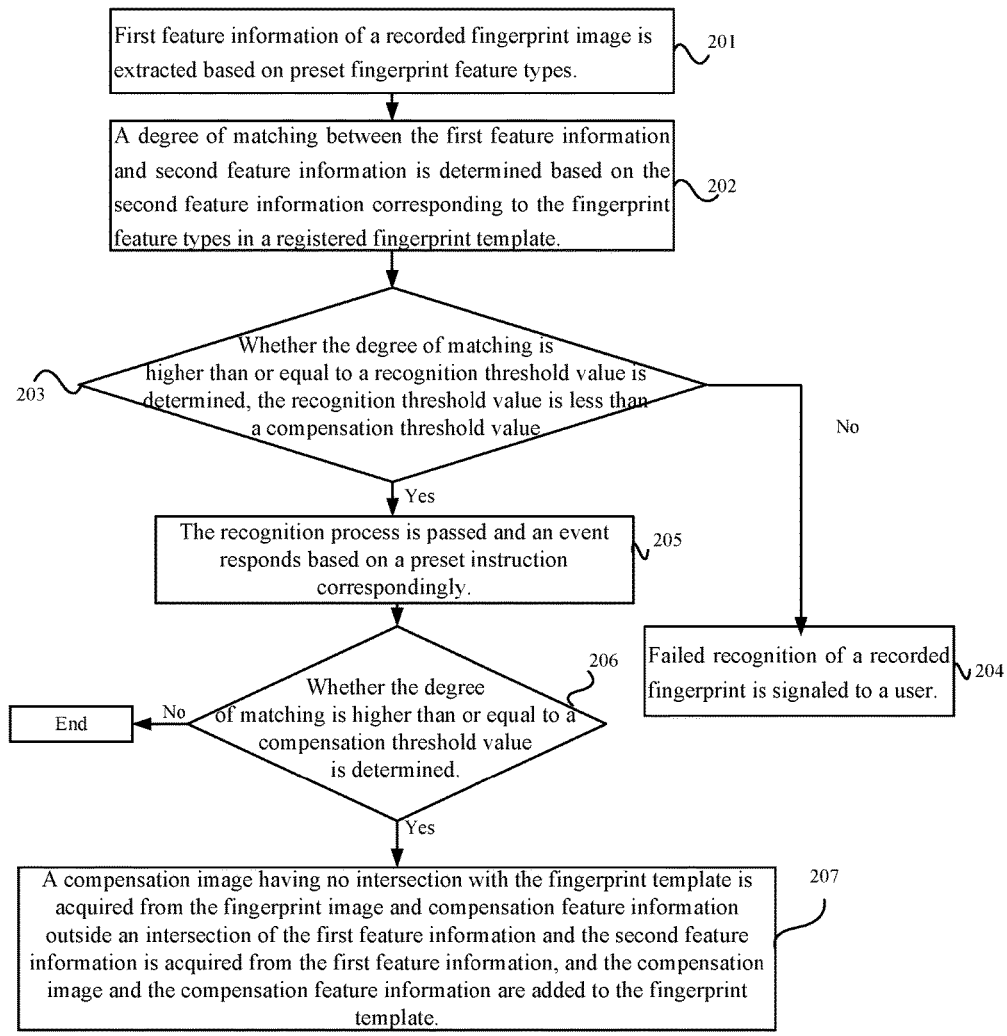
FIG. 2 illustrates a flowchart of a method for improving a fingerprint template according to another implementation of the present disclosure.

FIG. 2 illustrates a flowchart of a method for improving a fingerprint template according to another implementation of the present disclosure.

Figure 3:
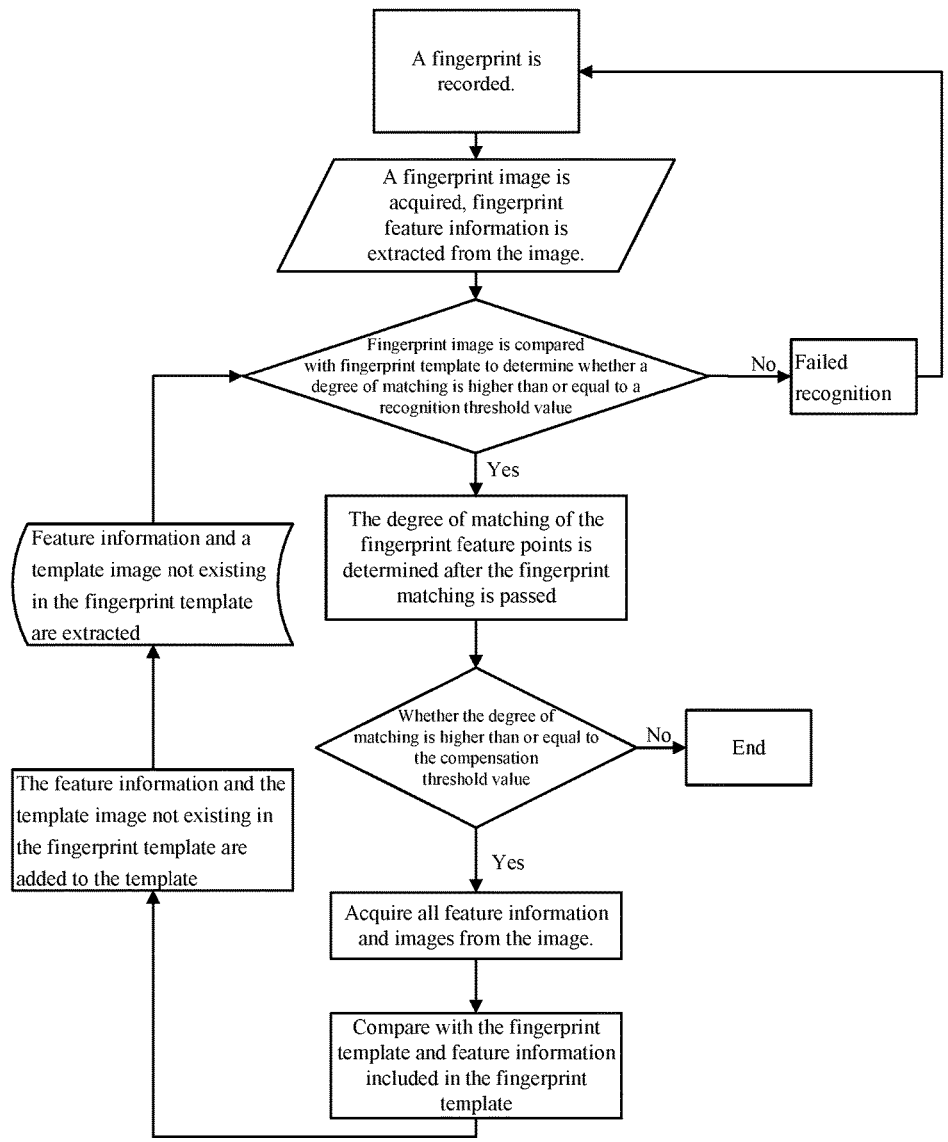
FIG. 3 illustrates a schematic diagram of a process for recognizing a fingerprint and improving a template.

FIG. 3 illustrates a schematic diagram of a process for recognizing a fingerprint and improving a template.

As shown in FIG. 2 and FIG. 3, the method for improving the fingerprint template can begin at block 201.

At block 201, first feature information of a recorded fingerprint image is extracted based on preset fingerprint feature types.

At block 202, a degree of matching between the first feature information and second feature information is determined based on the second feature information corresponding to the fingerprint feature types in a registered fingerprint template.

Detailed implementation processes of block 201 and block 202 according to the present implementation may be referred to the description of block 101 and block 102 in the implementation shown in FIG. 1, and a description in this regard is not provided.

At block 203, whether the degree of matching is higher than or equal to a preset recognition threshold value is determined, the recognition threshold value is less than a compensation threshold value.

The preset recognition threshold value is configured to determine whether the degree of matching between the recorded fingerprint image and the registered fingerprint template reaches the recognition threshold value. If the degree of matching between them is higher than or equal to the preset recognition threshold value, recognition process is passed to execute block 205. If the degree of matching between them is lower than the preset recognition threshold value, recognition process is not passed to execute block 204.

At block 204, failed recognition of a recorded fingerprint is signaled to a user if the degree of matching is lower than the recognition threshold value.

At block 205, the recognition process is passed and an event responds based on a preset instruction correspondingly if the degree of matching is higher than or equal to the recognition threshold value.

In greater detail, if the degree of matching is higher than or equal to the recognition threshold value, the corresponding event responds based on the preset instruction. The corresponding event that responds based on the preset instruction varies because of different application scenarios. Examples are provided as follows.

A screen of a terminal is unlocked based on an unlock instruction. Or, attendance is recorded based on a keypunch instruction. Or, a door is opened based on an access instruction. Or, a mobile payment is performed based on a payment instruction.

At block 206, whether the degree of matching is higher than or equal to the compensation threshold value that is preset is determined.

At block 207, a compensation image having no intersection with the fingerprint template is acquired from the fingerprint image and compensation feature information outside an intersection of the first feature information and the second feature information is acquired from the first feature information if the degree of matching is higher than or equal to the compensation threshold value, and the compensation image and the compensation feature information are added to the fingerprint template.

Detailed implementation processes of block 206 and block 207 according to the present implementation may be referred to the description of block 103 and block 104 in the implementation shown in FIG. 1, and a description in this regard is not provided.

According to the method for improving the fingerprint template of the present implementation, the first feature information of the recorded fingerprint image is first extracted based on the preset fingerprint feature types. Then, the degree of matching between the first feature information and the second feature information is determined based on the second feature information corresponding to the fingerprint feature types in the registered fingerprint template. Whether the degree of matching is higher than or equal to the preset recognition threshold value is determined. If not, the recognition fails. If yes, the corresponding event responds based on the preset instruction and whether the degree of matching is higher than or equal to the preset compensation threshold value is determined. The compensation image having no intersection with the fingerprint template is acquired from the fingerprint image if the degree of matching is higher than or equal to the compensation threshold value, and the compensation image is added to the fingerprint template. Hence, an initially registered fingerprint template is continuously improved during the fingerprint recognition process. The match rate of fingerprint recognition is improved, and the inflexibility and limitations of the fingerprint template are overcome, which improve the overall performance of the fingerprint recognition system in the registration phase and the recognition phase.

In order to realize the above implementation, the present application further provides a device for improving a fingerprint template.

Figure 4:
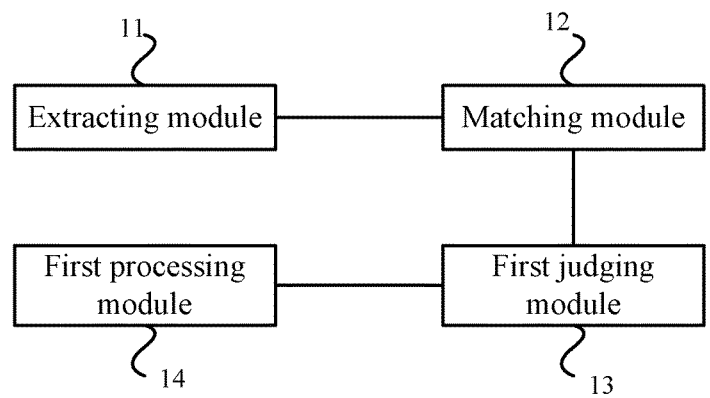
FIG. 4 illustrates a schematic diagram of a structure of a device for improving a fingerprint template according to one implementation of the present disclosure.

FIG. 4 illustrates a schematic diagram of a structure of a device for improving a fingerprint template according to one implementation of the present disclosure.

As shown in FIG. 4, the device for improving the fingerprint template includes an extracting module 11, a matching module 12, a first judging module 13, and a first processing module 14.

The extracting module 11 is configured to extract first feature information of a recorded fingerprint image based on preset fingerprint feature types.

The more preset fingerprint feature types there are, the higher the recognition accuracy for the fingerprint image is. Since the accuracy requirement for fingerprint image recognition in different application scenarios varies, the fingerprint feature types may be disposed depending on practical needs. An example is provided as follows.

The fingerprint feature types may be fingerprint feature points. The fingerprint feature points include one of a bifurcation point, an end point, a core point, and a delta point, or combinations thereof. A type of the fingerprint feature point may be selected depending on requirements of the application scenario. Or, the fingerprint feature types may be the fingerprint feature points, and combinations of direction information indicating relationships between the fingerprint feature points.

The matching module 12 is configured to determine a degree of matching between the first feature information and second feature information based on the second feature information corresponding to the fingerprint feature types in a registered fingerprint template.

The first judging module 13 is configured to determine whether the degree of matching is higher than or equal to a compensation threshold value that is preset.

The first processing module 14 is configured to acquire a compensation image having no intersection with the fingerprint template from the fingerprint image if the degree of matching is higher than or equal to the compensation threshold value, and add the compensation image to the fingerprint template.

In another implementation, the first processing module 14 is further configured to acquire compensation feature information outside an intersection of the first feature information and the second feature information from the first feature information, and add the compensation feature information to the fingerprint template.

The above illustration and description of the implementation of the method for improving the fingerprint template are also applied to the device for improving the fingerprint template according to the present implementation, and a description in this regard is not provided.

According to the device for improving the fingerprint template of the present implementation, the first feature information of the recorded fingerprint image is first extracted based on the preset fingerprint feature types. Then, the degree of matching between the first feature information and second feature information is determined based on the second feature information corresponding to the fingerprint feature types in the registered fingerprint template. Whether the degree of matching is higher than or equal to the preset compensation threshold value is determined. If the degree of matching is higher than or equal to the compensation threshold value, the compensation image having no intersection with the fingerprint template is acquired from the fingerprint image, and the compensation image is added to the fingerprint template. Hence, an initially registered fingerprint template is continuously improved during the fingerprint recognition process. The match rate of fingerprint recognition is improved, and the inflexibility and limitations of the fingerprint template are overcome, which improve the overall performance of the fingerprint recognition system in the registration phase and the recognition phase.

In order to more clearly describe the process for recognizing the recorded fingerprint image based on the recognition threshold value, and the process for improving the registered fingerprint template based on the compensation threshold value, a description is provided with reference to the subsequent implementation as follows.

Figure 5:
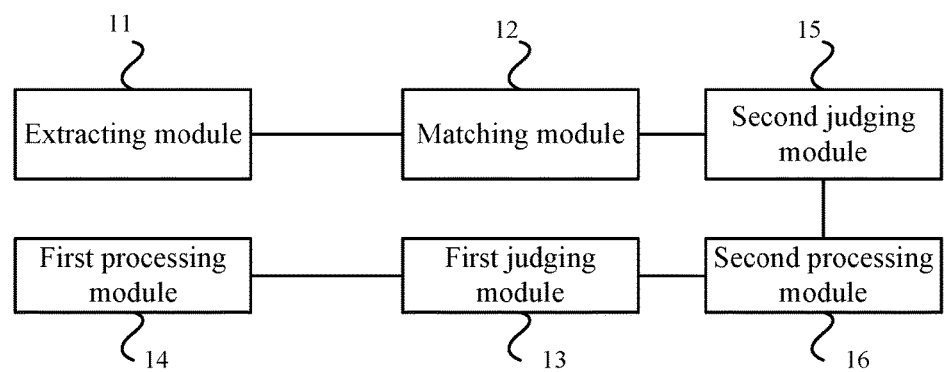
FIG. 5 illustrates a schematic diagram of a structure of a device for improving a fingerprint template according to another implementation of the present disclosure.

FIG. 5 illustrates a schematic diagram of a structure of a device for improving a fingerprint template according to another implementation of the present disclosure.

As shown in FIG. 5, based on the implementation in FIG. 4, the device for improving the fingerprint template further includes a second judging module 15 and a second processing module 16.

The second judging module 15 is configured to determine whether the degree of matching is higher than or equal to a recognition threshold value that is preset, the recognition threshold value is less than the compensation threshold value.

The second processing module 16 is configured to respond an event based on a preset instruction correspondingly if the degree of matching is higher than or equal to the recognition threshold value.

The corresponding event that responds based on the preset instruction varies because of different application scenarios. Examples are provided as follows. The second processing module 16 is configured to perform the following actions.

The second processing module 16 is configured to unlock a screen of a terminal based on an unlock instruction.

Or, the second processing module 16 is configured to record attendance based on a keypunch instruction.

Or, the second processing module 16 is configured to open a door based on an access instruction.

Or, the second processing module 16 is configured to perform a mobile payment based on a payment instruction.

In addition, the second processing module 16 is further configured to signal a user of failed recognition of a recorded fingerprint if the degree of matching is lower than the recognition threshold value.

The above illustration and description of the implementation of the method for improving the fingerprint template are also applied to the device for improving the fingerprint template according to the present implementation, and a description in this regard is not provided.

According to the device for improving the fingerprint template of the present implementation, the first feature information of the recorded fingerprint image is first extracted based on the preset fingerprint feature types. Then, the degree of matching between the first feature information and the second feature information is determined based on the second feature information corresponding to the fingerprint feature types in the registered fingerprint template. Whether the degree of matching is higher than or equal to the preset recognition threshold value is determined. If not, the recognition fails. If yes, the corresponding event responds based on the preset instruction and whether the degree of matching is higher than or equal to the preset compensation threshold value is determined. The compensation image having no intersection with the fingerprint template is acquired from the fingerprint image if the degree of matching is higher than or equal to the compensation threshold value, and the compensation image is added to the fingerprint template. Hence, an initially registered fingerprint template is continuously improved during the fingerprint recognition process. The match rate of fingerprint recognition is improved, and the inflexibility and limitations of the fingerprint template are overcome, which improve the overall performance of the fingerprint recognition system in the registration phase and the recognition phase.

In order to realize the above implementations, the present application further provides a terminal.

The terminal includes a terminal body and the device for improving the fingerprint template according to any of the above implementations of the present disclosure.

The types of terminals are many and may include, for example, a cell phone, an attendance device, a paying device, or an access control device.

The above illustration and description of the implementations of the methods for improving the fingerprint template are also applied to the terminal according to the present implementation, and their implementation principles are similar. A description in this regard is not provided.

According to the terminal of the present implementation, the first feature information of the recorded fingerprint image is first extracted based on the preset fingerprint feature types. Then, the degree of matching between the first feature information and second feature information is determined based on the second feature information corresponding to the fingerprint feature types in the registered fingerprint template. Whether the degree of matching is higher than or equal to the preset compensation threshold value is determined. If the degree of matching is higher than or equal to the compensation threshold value, the compensation image having no intersection with the fingerprint template is acquired from the fingerprint image, and the compensation image is added to the fingerprint template. Hence, an initially registered fingerprint template is continuously improved during the fingerprint recognition process. The match rate of fingerprint recognition is improved, and the inflexibility and limitations of the fingerprint template are overcome, which improve the overall performance of the fingerprint recognition system in the registration phase and the recognition phase.

In order to realize the above implementations, the present application further provides a terminal.

Figure 6:
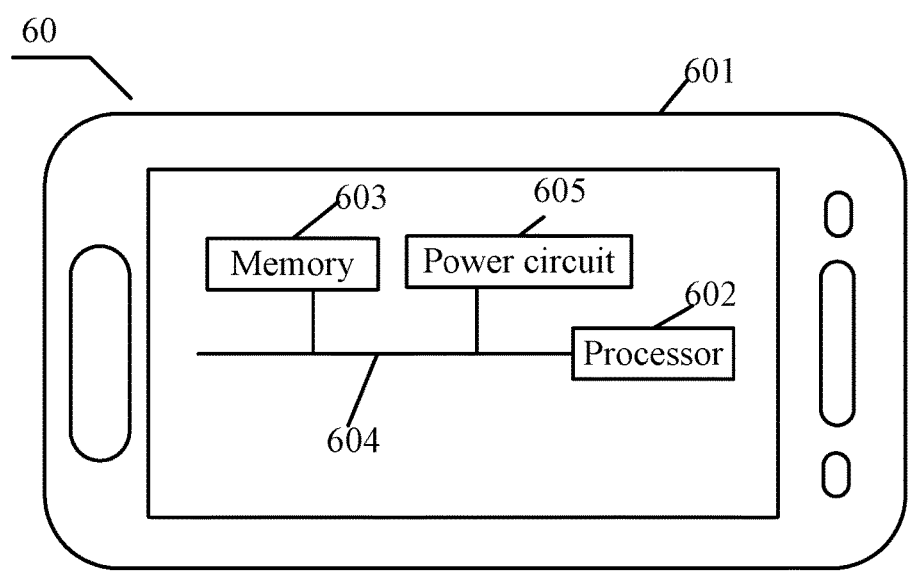
FIG. 6 illustrates a schematic diagram of a structure of a terminal according to one implementation of the present disclosure.

Refer to FIG. 6, FIG. 6 illustrates a schematic diagram of a structure of a terminal according to one implementation of the present disclosure.

A terminal 60 according to the present implementation includes a casing 601, a processor 602, a memory 603, a circuit board 604 and a power circuit 605. The circuit board 604 is disposed in a space surrounded by the casing 601. The processor 602 and the memory 603 are disposed on the circuit board 604. The power circuit 605 is configured to supply power to various circuits or components of the terminal. The memory 603 is configured to store executable program code. The processor 602 runs a program corresponding to the executable program code through reading the executable program code stored in the memory 603 so as to execute the following operations.

First feature information of a recorded fingerprint image is extracted based on preset fingerprint feature types.

A degree of matching between the first feature information and second feature information is determined based on the second feature information corresponding to the fingerprint feature types in a registered fingerprint template.

Whether the degree of matching is higher than or equal to a compensation threshold value that is preset is determined.

A compensation image having no intersection with the fingerprint template is acquired from the fingerprint image if the degree of matching is higher than or equal to the compensation threshold value, and the compensation image is added to the fingerprint template.

The above illustration and description of the implementations of the methods for improving the fingerprint template are also applied to the terminal according to the present implementation, and their implementation principles are similar. A description in this regard is not provided.

According to the terminal of the present implementation, the processor runs a program corresponding to the executable program code through reading the executable program code stored in the memory so as to execute the following operations. The first feature information of the recorded fingerprint image is first extracted based on the preset fingerprint feature types. Then, the degree of matching between the first feature information and second feature information is determined based on the second feature information corresponding to the fingerprint feature types in the registered fingerprint template. Whether the degree of matching is higher than or equal to the preset compensation threshold value is determined. If the degree of matching is higher than or equal to the compensation threshold value, the compensation image having no intersection with the fingerprint template is acquired from the fingerprint image, and the compensation image is added to the fingerprint template. Hence, an initially registered fingerprint template is continuously improved during the fingerprint recognition process. The match rate of fingerprint recognition is improved, and the inflexibility and limitations of the fingerprint template are overcome, which improve the overall performance of the fingerprint recognition system in the registration phase and the recognition phase.

In order to realize the above implementations, the present application further provides a non-transitory computer-readable storage medium storing a plurality of program instructions executable by a device. The device executes the plurality of program instructions to perform the fingerprint registration method as provided in the implementations with reference to FIG. 1.

In the description of this specification, the description of the terms "one implementation", "some implementations", "examples", "specific examples", or "some examples", and the like, means to refer to the specific feature, structure, material or characteristic described in connection with the implementations or examples being included in at least one implementation or example of the present disclosure. In the present specification, the term of the above schematic representation is not necessary for the same implementation or example. Furthermore, the specific feature, structure, material, or characteristic described may be in combination in a suitable manner in any one or more of the implementations or examples. In addition, it will be apparent to those skilled in the art that different implementations or examples described in this specification, as well as features of different implementations or examples, may be combined without contradictory circumstances.

In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

Any process or method described in the flowchart or otherwise described herein may be understood to include one or more modules, fragments, or portions of code of an executable instruction to implement a particular logical function or process. In addition, the scope of at least one implementation of the present disclosure includes additional implementations in which the functions may be performed in a sequence that is not shown or discussed, including in a substantially simultaneous manner or in the reverse order depending on the function involved, which is understood by those skilled in the art to which this present disclosure pertains.

The logic and/or blocks described in the flowchart or otherwise described herein, for example, a sequence list of an executable instruction for implementing a logic function, may be implemented in any computer-readable medium for use by an instruction execution system, device or equipment (such as a computer-based system, a system including a processor, or other system that can access instructions from an instruction execution system, device or equipment and execute instructions), or may be used in conjunction with the instruction execution system, device or equipment. As used herein, "computer-readable medium" may be any device that may include a store, communication, broadcast, or transmission program for use by an instruction execution system, device or equipment, or in conjunction with such instruction execution systems, device, or equipment. A more specific example (non-exhaustive list) of the computer-readable medium includes the following: an electrical connection portion (an electronic device) with one or more routing, a portable computer disk cartridge (a magnetic device), a random access memory (RAM), a read only memory (ROM), an erasable programmable read only memory (EPROM or a flash memory), a fiber optic device, and a portable compact disc read only memory (CDROM).

In addition, the computer-readable medium may even be a paper or other suitable medium on which the program may be printed. For example, through performing an optical scan on the paper or other media, followed by editing, interpretation, or, if necessary, other suitable methods to process, the program is obtained in an electronic manner, and then the program is stored in a computer memory.

It should be understood that the various parts of the present disclosure may be implemented by using hardware, software, firmware, or combinations thereof. In the above implementation, the plurality of blocks or methods may be implemented by using software or firmware stored in the memory and executed by a suitable instruction execution system. For example, if the present disclosure is implemented by hardware, as in another implementation, it may be implemented by any of the following techniques known in the art or a combination thereof: a discrete logic circuit of logic gates having a logic function for a data signal, an application specific integrated circuit with suitable combinational logic gates, a programmable gate array (PGA), a field programmable gate array (FPGA), and the like.

It will be understood by those of ordinary skill in the art that all or part of the blocks for implementing the method of the implementations described above may be accomplished by a program that commands the relevant hardware. The program may be stored in a computer readable storage medium. When the program is executed, one of the blocks of the method implementation or a combination thereof may be included.

In addition, the functional units in the various implementations of the present disclosure may be integrated into a processing module, or each unit may be physically present individually, or two or more units may be integrated into one module. The above integrated module may be implemented by using hardware, or may be implemented by using a software function module. The integrated module may be stored in a computer readable storage medium if it is implemented by a software function module and is sold or used as a standalone product.

The above-mentioned storage medium may be a read-only memory, a magnetic disk, or an optical disk. While the implementations of the present disclosure have been shown and described above, it is to be understood that the above implementations are exemplary and are not to be construed as limiting the present disclosure. One of ordinary skill in the art may make variations, modifications, substitutions and alterations to the above implementations within the scope of the present disclosure.

What is claimed is:

1. A method for improving a fingerprint template, performed by a terminal device, the method comprising:
    extracting first feature information of a recorded fingerprint image based on preset fingerprint feature types, wherein different fingerprint feature types are preset based on different recognition accuracy for the fingerprint image;
    determining a degree of matching between the first feature information and second feature information stored in a registered fingerprint template based on the second feature information corresponding to the fingerprint feature types;
    determining whether the degree of matching is higher than or equal to a preset compensation threshold value;
    when the degree of matching is higher than or equal to the compensation threshold value, acquiring, from the fingerprint image, a compensation image that has no common feature information with the fingerprint template, and adding the compensation image to the fingerprint template; and
    after determining the degree of matching between the first feature information and the second feature information, further comprising:
        determining whether the degree of matching is higher than or equal to a preset recognition threshold value, wherein the recognition threshold value is less than the compensation threshold value; and
        responding a corresponding event based on a preset instruction when the degree of matching is higher than or equal to the recognition threshold value.

2. The method of claim 1, wherein when the degree of matching is higher than or equal to the compensation threshold value, acquiring, from the fingerprint image, the compensation image that has no common feature information with the fingerprint template, and adding the compensation image to the fingerprint template comprises:
    acquiring, from the first feature information, compensation feature information that has no common feature information with the second feature information, when the degree of matching is higher than or equal to the compensation threshold value; and
    adding the compensation feature information to the fingerprint template.

3. The method of claim 1, wherein the fingerprint feature types comprise:
    fingerprint feature points, or
    fingerprint feature points and direction information indicating relationships between the fingerprint feature points, wherein the fingerprint feature points comprise any one of a bifurcation point, an end point, a core point and a delta point, and combinations thereof.

4. The method of claim 1, wherein responding the corresponding event based on the preset instruction comprises:
    unlocking a screen of a terminal based on an unlock instruction; or
    recording attendance based on a keypunch instruction; or
    opening an door based on an access instruction; or
    performing a mobile payment based on a payment instruction.

5. The method of claim 1, further comprising:
    when the degree of matching is lower than the recognition threshold value, signaling to a user for failed recognition of a recorded fingerprint.

6. A non-transitory computer-readable storage medium storing a computer program, which, when executed by a processor, causes the processor to:
    extract first feature information of a recorded fingerprint image based on preset fingerprint feature types, wherein different fingerprint feature types are preset based on different recognition accuracy for the fingerprint image;
    determine a degree of matching between the first feature information and second feature information stored in a registered fingerprint template based on the second feature information corresponding to the fingerprint feature types;
    determine whether the degree of matching is higher than or equal to a preset compensation threshold value;
    acquire, from the fingerprint image, a compensation image that has no common feature information with the fingerprint template, when the degree of matching is higher than or equal to the compensation threshold value, and add the compensation image to the fingerprint template;

after determining the degree of matching between the first feature information and the second feature information, the computer program further causes the processor to:
determine whether the degree of matching is higher than or equal to a preset recognition threshold value, wherein the recognition threshold value is less than the compensation threshold value; and
respond a corresponding event based on a preset instruction when the degree of matching is higher than or equal to the recognition threshold value.

7. The non-transitory computer-readable storage medium of claim 6, wherein the computer program that causes the processor to acquire, from the fingerprint image, the compensation image that has no common feature information with the fingerprint template, when the degree of matching is higher than or equal to the compensation threshold value, and add the compensation image to the fingerprint template causes the processor to:
acquire, from the first feature information, compensation feature information that has no common feature with the second feature information, when the degree of matching is higher than or equal to the compensation threshold value; and
add the compensation feature information to the fingerprint template.

8. The non-transitory computer-readable storage medium of claim 6, wherein the fingerprint feature types comprise:
fingerprint feature points, or
fingerprint feature points and direction information indicating relationships between the fingerprint feature points, wherein the fingerprint feature points comprise any one of a bifurcation point, an end point, a core point and a delta point, and combinations thereof.

9. The non-transitory computer-readable storage medium of claim 6, wherein the computer program that causes the processor to respond the corresponding event based on the preset instruction when the degree of matching is higher than or equal to the recognition threshold value causes the processor to:
unlock a screen of a terminal based on an unlock instruction; or
record attendance based on a keypunch instruction; or
open a door based on an access instruction; or
perform a mobile payment based on a payment instruction.

10. The non-transitory computer-readable storage medium of claim 6, wherein the computer program further causes the processor to:
signal to a user for failed recognition of a recorded fingerprint when the degree of matching is lower than the recognition threshold value.

11. A terminal device comprising:
a processor; and
a memory coupled to the processor and storing executable program codes thereon, which when executed by the processor, cause the processor to:
extract first feature information of a recorded fingerprint image based on preset fingerprint feature types, wherein different fingerprint feature types are preset based on different recognition accuracy for the fingerprint image;
determine a degree of matching between the first feature information and second feature information stored in a registered fingerprint template based on the second feature information corresponding to the fingerprint feature types;
determine whether the degree of matching is higher than or equal to a preset compensation threshold value;
when the degree of matching is higher than or equal to the compensation threshold value, acquire, from the fingerprint image, a compensation image that has no common feature information with the fingerprint template, and add the compensation image to the fingerprint template; and
after determining the degree of matching between the first feature information and the second feature information, the processor is further caused to:
determine whether the degree of matching is higher than or equal to a preset recognition threshold value, wherein the recognition threshold value is less than the compensation threshold value; and
respond a corresponding event based on a preset instruction when the degree of matching is higher than or equal to the recognition threshold value.

12. The terminal device of claim 11, wherein the executable program codes that cause the processor to acquire, from fingerprint image, the compensation image that has no common feature information with the fingerprint template, when the degree of matching is higher than or equal to the compensation threshold value, and add the compensation image to the fingerprint template cause the processor to:
acquire, from the first feature information, compensation feature information that has no common feature information with the second feature information, when the degree of matching is higher than or equal to the compensation threshold value; and
add the compensation feature information to the fingerprint template.

13. The terminal device of claim 11, wherein the fingerprint feature types comprise:
fingerprint feature points, or
fingerprint feature points and direction information indicating relationships between the fingerprint feature points, wherein the fingerprint feature points comprise any one of a bifurcation point, an end point, a core point and a delta point, and combinations thereof.

14. The terminal device of claim 11, wherein the executable program codes that cause the processor to respond the corresponding event based on the preset instruction cause the processor to:
unlock a screen of a terminal based on an unlock instruction; or
record attendance based on a keypunch instruction; or
open a door based on an access instruction; or
perform a mobile payment based on a payment instruction.

15. The terminal device of claim 11, wherein the executable program codes further cause the processor to:
signal to a user for failed recognition of a recorded fingerprint when the degree of matching is lower than the recognition threshold value.

* * * * *